United States Patent [19]

Oishi et al.

[11] Patent Number: 4,488,191

[45] Date of Patent: Dec. 11, 1984

[54] MAGNETIC RECORDING DISK CARTRIDGE

[75] Inventors: Kengo Oishi; Osamu Suzuki, both of Odawara, Japan

[73] Assignee: Fuji Photo Film Co., Ltd., Japan

[21] Appl. No.: 558,429

[22] Filed: Dec. 6, 1983

[30] Foreign Application Priority Data

Dec. 9, 1982 [JP] Japan ................ 57-216145

[51] Int. Cl.³ .............. G11B 5/012; G11B 5/52; G11B 23/02

[52] U.S. Cl. .................. 360/97; 360/86; 360/133

[58] Field of Search ........... 360/97, 99, 86, 133, 360/132, 131; 235/475, 483; 242/179, 197

[56] References Cited

U.S. PATENT DOCUMENTS 4,320,430  3/1982  Vogt ............... 360/133
4,412,260  10/1983  Stricklin ............. 360/132
4,419,703  12/1983  Gruczelak ............ 360/97

Primary Examiner—Robert M. Kilgore
Attorney, Agent, or Firm—Gerald J. Ferguson, Jr.; Joseph J. Baker

[57] ABSTRACT

A magnetic recording disk cartridge comprises a recording disk and a casing for accommodating the recording disk. The casing is provided with a pair of magnetic head receiving openings in the front and rear side walls thereof. The magnetic head receiving openings are normally closed and are opened when the cartridge is loaded in a recording-reproducing system. The shutter member for closing the magnetic head receiving openings is formed by bending a single plate material and comprises a pair of arm portions connected with each other by a bight portion. A pair of shutter portions for closing the respective magnetic head receiving openings are formed on the respective arm portions at an intermediate portion thereof. The free end portions of the arm portions respectively form bearing portions which are engaged with engaging ribs projecting inwardly from the front and rear side walls of the casing and support the shutter member for rotation about the ribs. The shutter member is connected to one end of a connecting member at the bight portion. The other end of the connecting member is exposed outside the casing to abut against an abutment member of the recording-reproducing system when the cartridge is loaded therein. The shutter member is normally held in an operative position in which the shutter portions close the magnetic head receiving openings, and is drawn by the connecting member whereby it is rotated to an inoperative position in which the shutter portions open the magnetic head receiving openings when the cartridge is loaded in the recording-reproducing system.

2 Claims, 2 Drawing Figures

MAGNETIC RECORDING DISK CARTRIDGE

BACKGROUND OF THE INVENTION

1. Field of the Invention

This invention relates to a magnetic recording disk cartridge, and more particularly to a magnetic recording disk cartridge for a magnetic recording disk which is small in diameter and extremely thin in thickness and which is rotated at a high speed for recording or reproduction.

2. Description of the Prior Art

There has come into wide use as a recording medium for computers a floppy disk which is a flexible disk of polyester resin coated with magnetic material on both sides thereof and on which digital information is recorded by a magnetic head. The floppy disk is easy to handle and inexpensive.

Recently, there has been proposed a photographic still camera in which, instead of a conventional silver salt photographic film which cannot be reused, a magnetic recording disk smaller than the floppy disk both in thickness and diameter is used as a recording medium. This still camera is generally referred to as "an electronic camera". This electronic camera is generally about the size of a typical 35 mm photographic camera. In the electronic camera the image of an object is magnetically recorded on the magnetic recording disk while the disk is rotated at a high speed. Generally the magnetic recording disk for the electronic camera is accommodated in a hard casing to form a cartridge and is loaded in the camera body together with the casing.

The magnetic recording disk for the electronic camera comprises a recording medium which is small in diameter and is extremely thin, and a hub fixed to the center of the recording medium. The casing for the disk has a hub opening through which the hub is exposed and a pair of magnetic head receiving openings in the front and rear side walls thereof, the magnetic head receiving openings being for giving the magnetic head of the recording-reproducing system access to the recording medium. In this specification, the term "recording-reproducing system" should be broadly interpreted to include systems for recording only and for reproduction only.

In recording images using a magnetic recording medium, signals are densely recorded on the magnetic recording medium since video signals have a wider frequency band than digital signals or audio signals. Accordingly, when fine unevenness, scratches at flaking exists in the magnetic coating on the magnetic recording medium or when dust is deposited on the magnetic coating, so-called drop-out occurs during reproduction and the recorded signals cannot be faithfully reproduced. Since the magnetic recording disk cartridge for the electronic camera is frequently used outside, dust is apt to get into the inside of the casing through the magnetic head receiving openings to adhere to the surface of the recording medium and there is a danger that the part of the recording medium exposed through the magnetic head receiving openings may be brought into contact with something outside the casing to be scratched thereby, while the cartridge is being carried.

Therefore, such cartridges are generally provided with a shutter mechanism which normally closes the magnetic head receiving opening and opens when the cartridge is loaded in the recording-reproducing system. Typically, the shutter mechanism includes a pair of shutter members which are disposed on opposite sides of the recording disk. Each shutter member comprises an annular bearing portion which is engaged for rotation with an annular engaging portion formed on the inner surface of the casing at its center, and a shutter portion which radially outwardly extends from the bearing portion and is adapted to close the magnetic head receiving opening. The shutter members are fixedly fit into engaging recesses formed on one end of a strip-like connecting member the other end of which is exposed outside the casing. The shutter members are normally held, by urging means, in an operative position in which the shutter portions close the respective magnetic head receiving openings and are rotated on the respective bearing portions to an inoperative position in which the shutter portions are retracted from the respective magnetic head receiving openings to open the same when the cartridge is loaded in the recording-reproducing system and said other end of the connecting member is pushed by an abutment portion provided in the system.

However, the conventional shutter mechanism is disadvantageous in that troublesome steps are required to incorporate the shutter members into the cartridge. For example, the shutter members must be engaged with the connecting member. Further, provision must be made for preventing each shutter member from disengaging from the engaging rib to fall toward the magnetic recording disk. Typically, a plurality of projections are formed on the periphery of each engaging rib and a like number of notches are formed on the bearing portion of each shutter member. When assembling the cartridge, each shutter member is moved to receive therein the engaging rib with the notches being aligned with the projections on the engaging rib and then rotated by an angle to move the notches out of alignment with the projections after the notches clear the projections.

SUMMARY OF THE INVENTION

In view of the foregoing observations and description, the primary object of the present invention is to provide a magnetic recording disk cartridge in which the shutter mechanism can be easily incorporated into the cartridge and the shutter member can be held in place without complicating the assembly steps of the cartridge.

The magnetic recording disk cartridge of the present invention is characterized by a single shutter member which is formed by bending a plate material and includes a pair of arm portions respectively having shutter portions for closing the magnetic head receiving openings in the upper and lower halves of the casing, the shutter member being connected to the connecting member at the bight portion between the shutter portions and being mounted for rotation in the casing at bearing portions provided on the free ends of the respective arm portions.

Since the shutter means for closing the two magnetic head receiving openings is of one piece in the cartridge of the present invention, it can be easily incorporated into the casing. Further, the arm portions cannot fall toward the recording disk since they are integrally connected with each other and mutually support each other. Thus, the shutter member can be held in place where the bearing portions are engaged with the engaging ribs without any additional provision.

If desired, one of the arm portions need not be provided with the bearing portion and the shutter member may be supported by the single bearing portion on the other arm portion.

It is preferred that the arm portions are formed to diverge away from each other toward the bearing portions so that the bearing portions are resiliently pressed against the inner surfaces of the upper and lower halves, whereby the bearing portions are more positively prevented from disengaging from the engaging ribs.

BRIEF DESCRIPTION OF THE DRAWINGS

FIG. 2 is a fragmentary perspective view showing a modification of the cartridge of FIG. 1.

DESCRIPTION OF THE PREFERRED EMBODIMENTS

Figure 1:
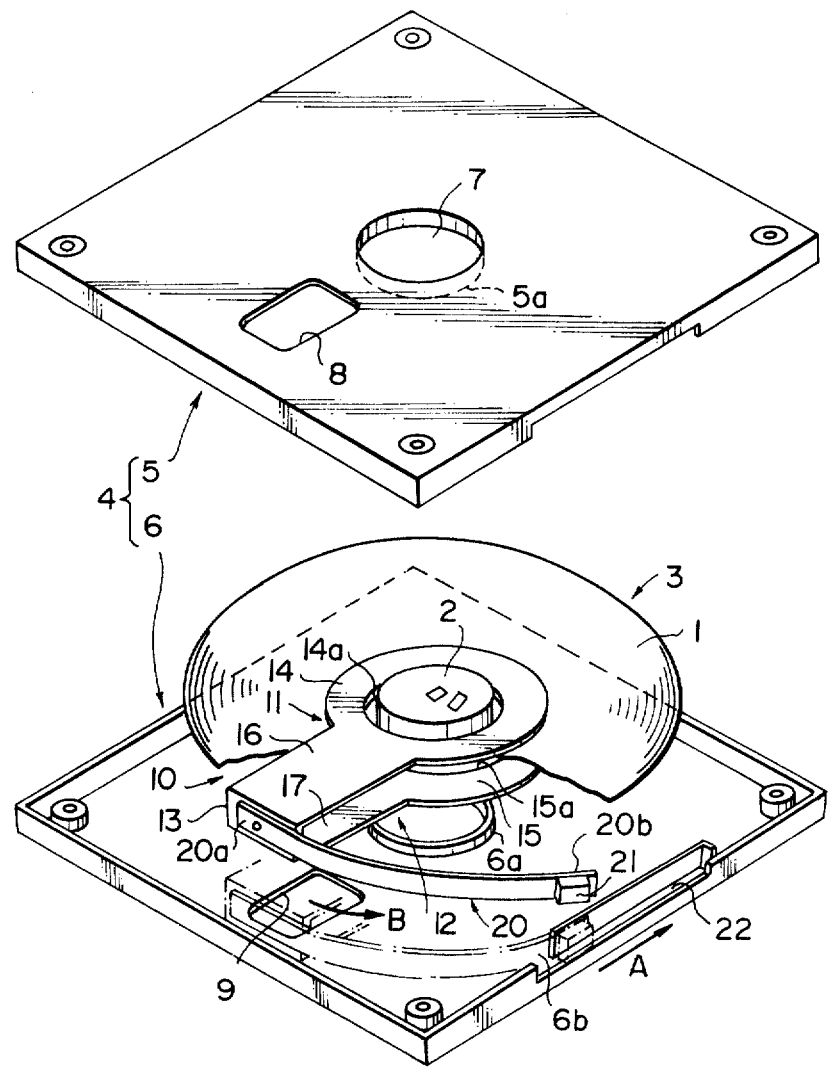
FIG. 1 is an exploded perspective view of a magnetic recording disk cartridge in accordance with an embodiment of the present invention.

FIG. 1 shows a magnetic recording disk cartridge in accordance with an embodiment of the present invention comprising a magnetic recording disk 3, which consists of a thin flexible magnetic recording medium 1 and a hub 2 fixed to the center of the recording medium 1, and a casing 4 for accommodating the magnetic recording disk 3. The magnetic recording medium 1 is composed of a very thin polyester sheet having a thickness of, for instance, 50μ or less with a magnetic coating formed thereon by, for instance, applying, vapor-depositing or sputtering a magnetic material appropriate for the purpose. The casing 4 comprises upper and lower halves 5 and 6 which are secured together with screws or by supersonic welding, for example. The upper half 5 is provided with a hub opening 7 at its center through which the hub 2 of the recording disk 3 is exposed, and an annular engaging rib 5a which stands inwardly (downwardly) from the periphery of the hub opening 7. The lower half 6 is provided with an annular engaging rib 6a which is similar to the rib 5a of the upper half 5 and is opposed to the same. A pair of magnetic head receiving openings 8 and 9 are respectively formed in the upper and lower halves 5 and 6 opposed to each other.

A shutter member 10 comprises first and second arm portions 11 and 12 which are connected with each other by a connecting portion 13, and is formed by stamping and bending a plate material such as a steel plate. The first and second arm portions 11 and 12 are respectively provided with bearing portions 14 and 15 respectively having circular engaging openings 14a and 15a. The bearing portions 14 and 15 are respectively connected to the connecting portion 13 by way of a rectangular shutter portions 16 and 17 which are adapted to close the magnetic head receiving openings 8 and 9. The first and second arm portions 11 and 12 extend on opposite sides of the recording disk 3, and the engaging openings 14a and 15a of the bearing portions 14 and 15 respectively receive the engaging ribs 5a and 6a of the upper and lower halves 5 and 6 so that the shutter member 10 can be rotated about the engaging ribs 5a and 6a which are disposed coaxially and respectively receive the upper and lower portions of the hub 2 with the upper portion of the hub 2 exposed through the hub opening 7.

A strip-like connecting member 20 formed of a resilient material such as a steel plate is connected to the connecting portion 13 of the shutter member 10 at one end 20a by, for instance, spot welding. An abutment member 21 is fixed to the other end 20b of the connecting member 20. The abutment member 21 is exposed outside through a cutaway portion 6b in the lower half 6 and is received in a channel 22 provided in the side of the casing 4, as shown by the chained line in FIG. 1, in the assembled state of the cartridge to be slid along the channel 22. The shutter 10 is formed of a resilient material such as a steel plate as described above, and is formed so that the first and second arm portions 11 and 12 thereof diverge away from each other toward the bearing portions 14 and 15, whereby the bearing portions 14 and 15 are resiliently pressed against the inner surfaces of the upper and lower halves 5 and 6 around the engaging ribs 5a and 6a and thus are prevented from being disengaged from the engaging ribs 5a and 6a.

In the assembled state of the cartridge, the shutter member 10 is positioned in an operative position shown by the chained line by urging means (not shown) which may be a known one conventionally employed in the art. In the operative position, the shutter portions 16 and 17 respectively close the magnetic head receiving openings 8 and 9 to prevent the recording medium 1 of the recording disk 3 from being brought into contact with and scratched by something outside the casing 4.

When the cartridge is loaded in the recording-reproducing system, the abutment member 21 is engaged with an abutment portion provided in the system and is drawn by the connecting member 20 to move in the direction of the arrow A in FIG. 1, whereby the shutter member 10 is rotated in the direction of the arrow B to its inoperative position in which the shutter portions 16 and 17 are retracted from the respective magnetic head receiving openings 8 and 9 to open them.

When the magnetic head receiving openings 8 and 9 are opened, the magnetic head has access to the recording disk 3 for recording or reproduction while the recording disk 3 is rotated at a high speed by the rotational shaft of the recording-reproducing system which is engaged with the hub 2 of the disk 3.

Since the connecting member 20 is formed of a resilient material, it maintains the outwardly convex shape shown in FIG. 1 when it is moved as described above and does not prevent rotation of the recording disk 3.

When the cartridge is taken out of the recording-reproducing system, the shutter member 10 is returned to the operative position by said urging means.

In the magnetic recording disk cartridge of this embodiment, since the shutter portions 16 and 17 for respectively closing the magnetic head receiving openings 8 and 9 of the upper and lower halves 5 and 6 are integrally formed with the connecting portions 13, and the bearing portions 14 and 15 are resiliently pressed against the inner surfaces of the upper and lower halves 5 and 6 there is no danger of the shutter portions 16 and 17 falling down toward the recording disk 3 with the bearing portions 14 and 15 disengaged from the engaging ribs 5a and 6a.

Though in the embodiment shown in FIG. 1, the shutter member 10 is connected to the connecting member 20 by spot welding, the shutter member 10 may be connected to the connecting member 20 by any suitable method. For example, in the modification shown in FIG. 2, the connecting member 30 has a tapered inner end portion which is bifurcated by a slot 32 to form a pair of arms 31a and 31b each having an engaging shoulder 31c. The connecting portion 13' of the shutter member 10' is provided with a hollow engaging portion 33 having a through passageway which is rectangular in cross section. The tapered inner end portion of the connecting member 30 is forced into the passageway from one end of the passageway so that the inner end portion projects from the other end of the passageway. When the inner end portion is forced into the passageway, the arms 31a and 31b are resiliently compressed toward each other and when the inner end portion projects from the passageway the arms 31a and 31b expand away from each other, whereby the engaging shoulders 31c thereof engage with end of the engaging portion to prevent withdrawal of the connecting member 30.

Further, the connecting member may be connected to the connecting portion of the shutter member by caulking. For example, a plurality of projections are provided on the inner end of the connecting member and inserted into small holes formed in the connecting portion of the shutter member, and subsequently the projecting end portion of ech projection is caulked, for instance, by supersonics.

We claim:

1. A magnetic recording disk cartridge comprising a magnetic recording disk, a casing which accommodates the recording disk for rotation therein and has a pair of magnetic head receiving openings for giving the magnetic head of a recording-reproducing system access to the recording disk, and shutter means which normally closes the magnetic head receiving openings and opens the same when the cartridge is loaded in the recording-reproducing system, wherein the improvement comprises a single shutter member which is formed by bending a plate material and includes a pair of arm portions integrally connected with each other by way of a bight portion, the arm portions extending radially inwardly from the bight portion toward the center of the casing on opposite sides of the recording disk and respectively having shutter portions adapted to close the magnetic head receiving openings, at least one arm portion being provided with an annular bearing portion at its free end, the bearing portion being engaged with an engaging portion formed in the inner surface of the casing to support the shutter member for rotation between an operative position in which said shutter portions close the magnetic head receiving openings and an inoperative position in which the shutter portions open the same, one end of a connecting member being operatively connected to the bight portion of the shutter member and the other end of the connecting member being exposed outside the casing, whereby the shutter member is rotated to the inoperative position in response to movement of said the other end of the connecting member.

2. A magnetic recording disk cartridge as defined in claim 1 in which said arm portions diverge away from each other toward their free ends and the free ends of the arm portions are resiliently pressed against the inner surfaces of the casing by the resiliency of the shutter member itself.

* * * * *